United States Patent
Zhang

(10) Patent No.: US 12,302,403 B2
(45) Date of Patent: May 13, 2025

(54) METHOD AND SYSTEM FOR DATA TRANSMISSION IN WIRELESS NETWORK

(71) Applicant: ZTE Corporation, Guangdong (CN)

(72) Inventor: Li Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 473 days.

(21) Appl. No.: 17/705,822

(22) Filed: Mar. 28, 2022

(65) Prior Publication Data

US 2022/0225423 A1 Jul. 14, 2022

Related U.S. Application Data

(63) Continuation of application No. PCT/CN2019/109450, filed on Sep. 30, 2019.

(51) Int. Cl.
*H04W 74/08* (2024.01)
*H04W 74/00* (2009.01)
(Continued)

(52) U.S. Cl.
CPC ..... *H04W 74/0833* (2013.01); *H04W 74/006* (2013.01); *H04W 80/02* (2013.01)

(58) Field of Classification Search
CPC ......... H04W 74/0833; H04W 74/0838; H04W 74/0836
See application file for complete search history.

(56) References Cited

U.S. PATENT DOCUMENTS 11,116,005 B2 9/2021 Shin et al.
11,690,097 B2 6/2023 Yang
(Continued)

FOREIGN PATENT DOCUMENTS

CN 109792785 A 5/2019
CN 110178335 A 8/2019
(Continued)

OTHER PUBLICATIONS

Samsung, "Random Access in NR: RAR MAC PDU Design", 3GPP TSG-RAN WG2 #99, Berlin, Germany, R2-1707683, 4 pages, Aug. 21-25, 2017. (Year: 2017).*

(Continued)

*Primary Examiner* — Romani Ohri
(74) *Attorney, Agent, or Firm* — Perkins Coie LLP

(57) ABSTRACT

Methods, apparatus, and systems for improving data transmission efficiency in a wireless network are described. In one example aspect, a wireless communication method includes receiving a plurality of preambles and a plurality of corresponding media access control random access responses through a plurality of cells, upon a determination that the plurality of preambles is received in the same random access channel resource, multiplexing the plurality of corresponding media access control random access responses into one medium access control protocol data unit, upon a determination that the plurality of corresponding media access control random access responses is in different single frequency networks, adding an indication, to a media access control sub-header, that the one medium access control protocol data unit includes the plurality of media access control random access responses, and transmitting the medium access control protocol data unit including the media access control sub-header with the indication.

10 Claims, 16 Drawing Sheets

(51) Int. Cl.
  *H04W 74/0833* (2024.01)
  *H04W 80/02* (2009.01)

(56) References Cited

U.S. PATENT DOCUMENTS

| | | | |
|---|---|---|---|
| 2020/0053793 A1* | 2/2020 | Loehr | H04W 80/02 |
| 2020/0100299 A1* | 3/2020 | Loehr | H04W 72/0446 |
| 2022/0078850 A1* | 3/2022 | Hong | H04W 74/0808 |
| 2022/0256609 A1* | 8/2022 | Wu | H04W 74/0833 |

FOREIGN PATENT DOCUMENTS

| | | | |
|---|---|---|---|
| KR | 20180036711 A | | 4/2018 |
| WO | 2019/004680 A1 | | 1/2019 |

OTHER PUBLICATIONS

Indonesian office action issued in ID Patent Application No. P00202205195, dated Jan. 31, 2024, 4 pages. English translation included.

International Search Report and Written Opinion mailed on Jun. 23, 2020 for International Application No. PCT/CN2019/109450, filed on Sep. 30, 2019 (6 pages).

Samsung, "Random Access in NR: RAR MAC PDU Design", 3GPP TSG-RAN WG2 #99, Berlin, Germany, R2-1707683, 4 pages, Aug. 21-25, 2017.

Intel Corporation, "Discussion on procedure for 2-step RACH", 3GPP TSG RAN WG1 #97, Reno, USA, R1-1906780, 7 pages, May 13-17, 2019.

European Search Report for EP Patent Application No. 19947846.2, dated Aug. 19, 2022, 11 pages.

European Communication pursuant to Article 94(3) EPC issued in EP Patent Application No. 19947846.2, dated Sep. 23, 2024, 6 pages.

Chinese office action issued in CN Patent Application No. 201980100945.1, dated Sep. 26, 2024, 36 pages. English translation included.

Indonesian office action issued in ID Patent Application No. P00202205195, dated Oct. 31, 2024, 4 pages. English translation included.

Korean office action issued in KR Patent Application No. 10-2022-7013916, dated Jan. 10, 2025, 15 pages. English translation included.

* cited by examiner

METHOD AND SYSTEM FOR DATA TRANSMISSION IN WIRELESS NETWORK

CROSS-REFERENCE TO RELATED APPLICATIONS

This application is a continuation of International Patent Application No. PCT/CN2019/109450, filed on Sep. 30, 2019, the contents of which are incorporated herein by reference in their entirety.

TECHNICAL FIELD

This document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for reducing or minimizing collision in wireless networks.

In an example embodiment of the disclosed technology, a wireless communication method is disclosed. The wireless communication method includes receiving a plurality of preambles and a plurality of corresponding media access control random access responses through a plurality of cells, upon a determination that the plurality of preambles is received in the same random access channel resource, multiplexing the plurality of corresponding media access control random access responses into one medium access control protocol data unit, upon a determination that the plurality of corresponding media access control random access responses is in different single frequency networks, adding an indication, to a media access control sub-header, that the one medium access control protocol data unit includes the plurality of media access control random access responses, and transmitting the medium access control protocol data unit including the media access control sub-header with the indication.

In another example embodiment of the disclosed technology, a wireless communication method is disclosed. The wireless communication method includes receiving a plurality of preambles and a plurality of corresponding media access control random access responses through a plurality of cells, upon a determination that the plurality of preambles is received in the same random access channel resource, multiplexing the plurality of corresponding media access control random access responses into one medium access control protocol data unit, upon a determination that the plurality of corresponding media access control random access responses is in different single frequency networks, adding an indication, to a backoff indicator sub-header, that the one medium access control protocol data unit includes the plurality of media access control random access responses, and transmitting the medium access control protocol data unit including the backoff indicator sub-header with the indication.

In yet another example embodiment of the disclosed technology, a wireless communication method is disclosed. The wireless communication method includes receiving a plurality of preambles and a plurality of corresponding media access control random access responses through a plurality of cells, upon a determination that the plurality of preambles is received in the same random access channel resource, multiplexing the plurality of corresponding media access control random access responses into one medium access control protocol data unit, and transmitting the medium access control protocol data unit. Each of the plurality of media access control random access responses includes an indication to distinguish a part of the medium access control protocol data unit received through a licensed cell from another part of the medium access control protocol data unit received through an unlicensed cell.

Some embodiments may preferably implement these methods as follows:

The above methods, wherein the different single frequency networks have the same random access response.

The above methods, wherein, upon receipt of the plurality of preambles and the plurality of corresponding media access control random access responses through an unlicensed cell, the indication includes a single frequency network preamble.

The above methods, wherein the plurality of cells includes both licensed cell and unlicensed cell, and wherein the method further includes adding an additional indication to the media access control sub-header to distinguish the licensed cell from the unlicensed cell.

The above methods, wherein the media access control sub-header in the licensed cell has a different random access preamble identifier field format from the media access control sub-header in the unlicensed cell.

The above methods, wherein the media access control sub-headers in the licensed cell and the unlicensed cell have a common field configured to have the same value.

The above methods, wherein the common field has a first value to indicate that the media access control sub-header includes a random access preamble identifier field.

The above methods, wherein the common field has a second value to indicate that the media access control sub-header includes both the random access preamble identifier field and a single frequency network identifier.

The above methods, wherein the different single frequency networks have the same random access response.

The above methods, wherein, upon receipt of the plurality of preambles and the plurality of corresponding media access control random access responses through an unlicensed cell, the indication includes a single frequency network preamble.

The above methods, wherein the media access control sub-header in the licensed cell has a different backoff indicator field format from the media access control sub-header in the unlicensed cell.

The above methods, wherein the media access control sub-headers in the unlicensed cell has a field to indicate whether a certain media access control random access response is from a new radio cell.

The above methods, wherein the media access control random access responses in the licensed cell and the unlicensed cell have a common field configured to have the same value.

The above methods, wherein the common field has a first value to indicate that the media access control random access responses are used in the licensed cell.

The above methods, wherein the plurality of cells includes both licensed cell and unlicensed cell, and wherein the method further includes generating separate medium access control protocol data units to distinguish the media access control random access responses received through the licensed cell from the media access control random access responses received through the unlicensed cell.

The above methods, wherein the medium access control protocol data unit received through the unlicensed cell includes a single frequency network identifier sub-header.

The above methods, wherein the media access control random access responses in the licensed cell and the unlicensed cell have a common field configured to indicate either a backoff indicator sub-header or a single frequency network.

In yet another example embodiment of the disclosed technology, the above-described methods are embodied in the form of processor-executable code and stored in a computer-readable program medium.

In yet another example embodiment of the disclosed technology, a device that is configured or operable to perform the above-described methods is disclosed.

The above and other aspects and their implementations are described in greater detail in the drawings, the descriptions, and the claims.

DETAILED DESCRIPTION

A recent wireless communication standard allows for transmission in an unlicensed spectrum using a listen-before-talk (LBT) procedure that performs a clear channel assessment (CCA) check before the transmission. The CCA utilizes, among other things, energy detection techniques to determine the presence or absence of other signals on the channel, determining if the channel is occupied or clear. If the channel is occupied, a network node enters a backoff state. In this state, a backoff timer is started and the node waits until the backoff timer expires before performing another LBT procedure. The backoff timer is decremented at each unoccupied slot on the medium. If the channel is clear, the node can transmit messages. The duration of transmission, which can be represented by channel occupancy time (COT), is limited and governed by backoff parameters used to access the channel.

When a user equipment (UE) transmits a first message such as a random access channel (RACH) preamble, it will start a time window (e.g., ra-ResponseWindow configured in RACH-ConfigCommon) at the first physical downlink control channel (PDCCH) occasion from the end of the RACH preamble transmission. Here, the PDCCH occasion indicates a time duration (i.e. one or a consecutive number of symbols) during which a media access control (MAC) entity is configured to monitor the PDCCH. However, a second message (e.g., Msg2) transmission may subject to LBT failure, such that the time window (e.g., ra-ResponseWindow) may expire and a random access response (RAR) reception fails. One possible scheme is to extend an RAR window or timer. When the RAR window or timer is extended, some overlapping area may occur, resulting in collision in the network. In order to solve the issue, a least significant bit (LSB) of single frequency network (SFN) transmitting preamble may be included in the media access control random access response (MAC RAR) or Msg2 or msgB.

The embodiments of the disclosed technology provide the designs of MAC RAR format to avoid the overlapping area that can potentially create data collisions with simultaneous transmissions destined for the same device.

Figure 1:
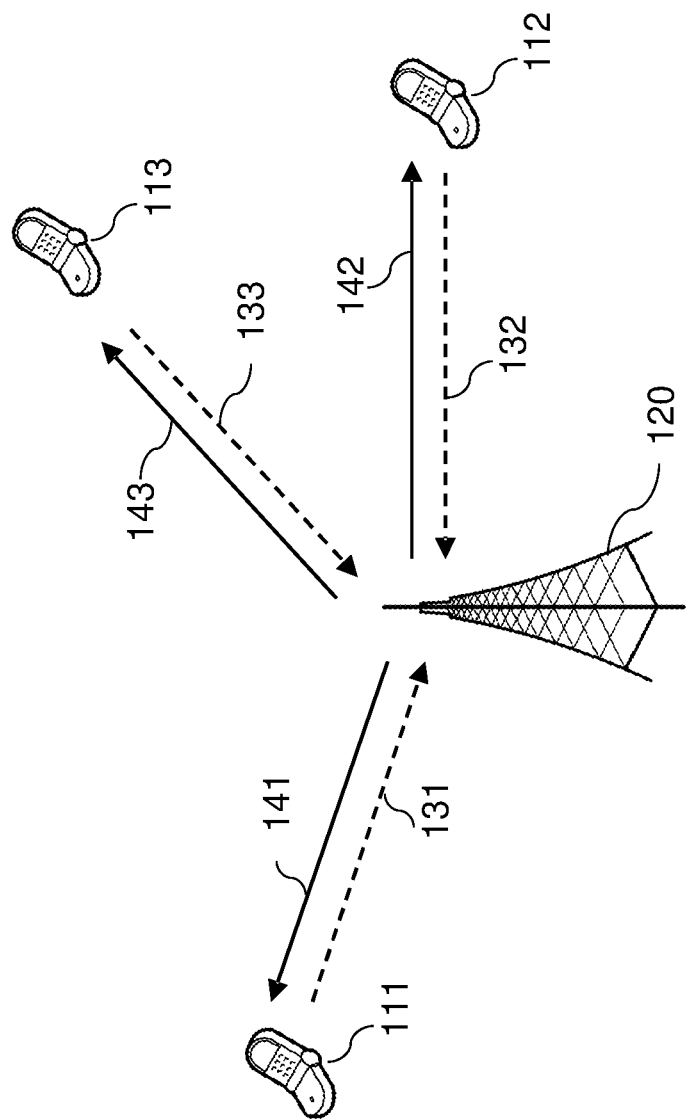
FIG. 1 shows an example of a wireless communication system.

FIG. 1 shows an example of a wireless communication system (e.g., an LTE, 5G New Radio (NR) cellular network) that includes a radio access node 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

Some embodiments of the disclosed technology relate to the design of MAC RAR for an unlicensed spectrum when the LSB of the SFN transmitting preamble is included in Msg2. In addition, since a carrier aggregation for licensed spectrum and unlicensed spectrum is supported, the MAC RARs from a licensed cell and an unlicensed cell may be multiplexed into one medium access control (MAC) protocol data unit (PDU). For an unlicensed cell, since the format of MAC PDU differs from the licensed cell's MAC RAR format, some embodiments of the disclosed technology can be used to include an indication that can distinguish the transmission from the licensed cell from the transmission from the unlicensed cell. In an implementation, the indication may be included in a sub-header with a random access preamble ID (RAPID) field. In another implementation, the indication may be included in a sub-header with a backoff indicator (BI) field. In yet another implementation, the indication may be included in a MAC RAR.

Figure 2:
FIG. 2 illustrates an example configuration of media access control (MAC) sub-header with random access preamble ID (RAPID) format in a licensed cell based on some embodiments of the disclosed technology.
Figure 3:
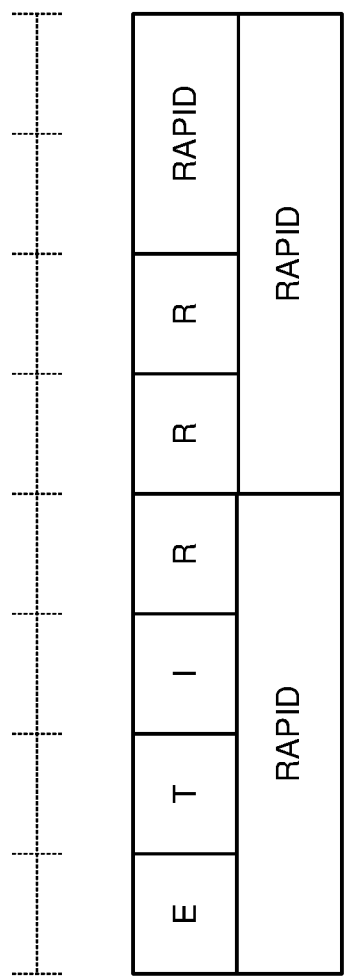
FIG. 3 illustrates an example configuration of MAC sub-header with RAPID format in an unlicensed cell based on some embodiments of the disclosed technology.

FIG. 2 illustrates an example configuration of MAC sub-header with RAPID format in a licensed cell based on some embodiments of the disclosed technology. FIG. 3 illustrates an example configuration of MAC sub-header with RAPID format in an unlicensed cell based on some embodiments of the disclosed technology.

The field "R" indicates a reserved bit. In one example, the field "E" is an extension field, which is a flag indicating if the MAC subPDU including this MAC subheader is the last MAC subPDU or not in the MAC PDU. The field "T" is a type field, which is a flag indicating whether the MAC subheader contains a Random Access Preamble ID or a Backoff Indicator.

In some embodiments of the disclosed technology, a RAPID sub-header is used to include an indication for distinguishing the transmission through the licensed cell from the transmission through the unlicensed cell.

For one UE, multiple cells may be configured, for example, an unlicensed cell acts as PCell and a licensed cell acts as SCell. According to the current specification, for SCell, when a preamble is transmitted on SCell, the corresponding MAC RAR is transmitted on PCell. In some embodiments of the disclosed technology, when multiple preambles are received in the same random access channel preamble (PRACH) resource, the corresponding MAC RAR from the different cells (PCell and SCell) may be multiplexed into one MAC PDU which is transmitted in PCell.

In some embodiments of the disclosed technology, for an unlicensed cell, if MAC RARs in a different single frequency network (SFN) having the same random access response (RA-RNTI) are multiplexed into one medium access control protocol data unit (MAC PDU), for the receiving preambles, the corresponding SFN transmitting preamble is included in a sub-header with a RAPID field.

In a carrier aggregation (CA) scenario of unlicensed cell and licensed cell, since the MAC RARs are multiplexed into one MAC PDU and the sub-header with RAPID from unlicensed cell and licensed cell is different, a distinction indication is included based on some embodiments of the disclosed technology.

As shown in FIG. 2, the sub-header with RAPID of licensed cell may include "T" field, and "RAPID" field, as well as the "E" field, the "T" field, and the "R" field. As shown in FIG. 3, the sub-header with RAPID of unlicensed cell may include the "T" field, the "RAPID" field, and "SFNID" field, as well as the "E" field, the "T" field, and the "R" field. In some embodiments of the disclosed technology, when the "T" field is set to 0, the sub-header includes RAPID only. If the "T" field is set to 1, the sub-header includes both the RAPID and LSB of SFN.

Figure 4:
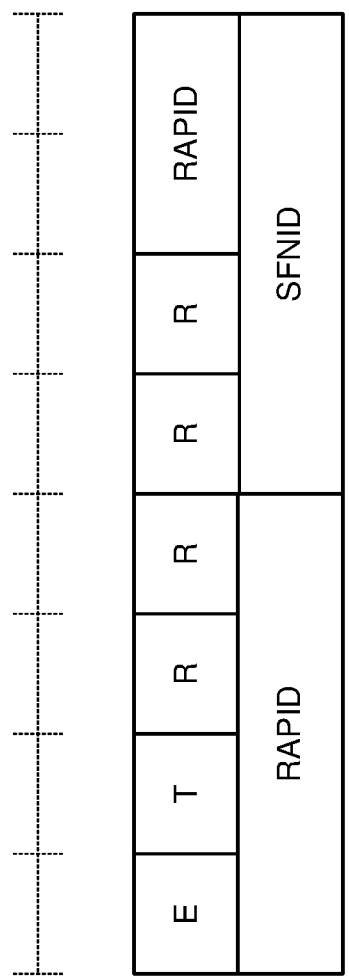
FIG. 4 illustrates an example configuration of MAC sub-header with RAPID format in an unlicensed cell based on some embodiments of the disclosed technology.

FIG. 4 illustrates an example configuration of MAC sub-header with RAPID format in an unlicensed cell based on some embodiments of the disclosed technology.

In another embodiment of the disclosed technology, as shown in FIG. 4, the sub-header with RAPID of unlicensed cell may include the "RAPID" field, and "SFNID" field, the "E" field, the "T" field, and the "R" field. In some embodiments of the disclosed technology, in a carrier aggregation (CA) scenario of unlicensed cell and licensed cell, separate MAC PDUs are generated for a licensed cell and an unlicensed cell. For the unlicensed cell, the MAC sub-header based on some embodiments of the disclosed technology includes an SFNID. In some implementations, the SFN ID may be LSB of SFN transmitting preamble.

Figure 5:
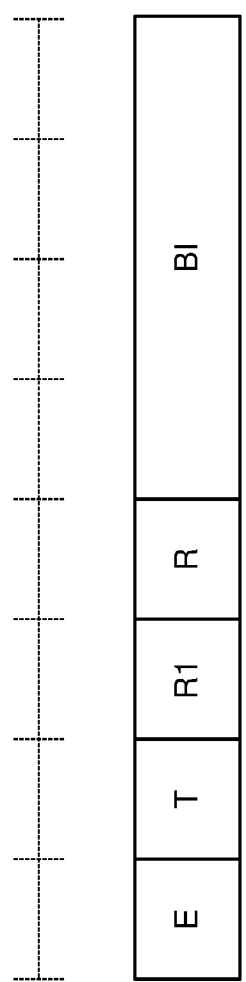
FIG. 5 illustrates an example configuration of backoff indicator (BI) sub-header for an unlicensed cell based on some embodiments of the disclosed technology.
Figure 6:
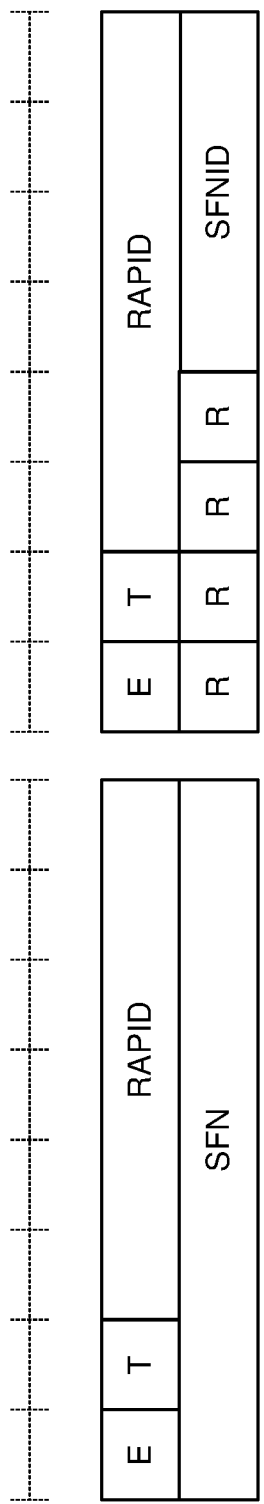
FIG. 6 illustrates an example configuration of a sub-header with RAPID and single frequency network ID (SFNID) based on some embodiments of the disclosed technology.

FIG. 5 illustrates an example configuration of BI sub-header for an unlicensed cell based on some embodiments of the disclosed technology. FIG. 6 illustrates an example configuration of a sub-header with RAPID and SFNID based on some embodiments of the disclosed technology.

In some embodiments of the disclosed technology, a BI sub-header is configured to include an indication for distinguishing the transmission through the licensed cell from the transmission through the unlicensed cell, and MAC RARs in the different SFN are multiplexed into one MAC PDU. In one example, the field "BI" is a backoff indicator field, which is used to identify the overload condition in the cell. In one example, "R1" indicates another reserved field.

For one UE, multiple cells may be configured, for example, an unlicensed cell acts as PCell and a licensed cell acts as SCell. According to the current specification, for SCell, when a preamble is transmitted on SCell, the corresponding MAC RAR is transmitted on PCell. In some embodiments of the disclosed technology, when multiple preambles are received in the same PRACH resource, the corresponding MAC RAR from the different cells (e.g., PCell and SCell) may be multiplexed into one MAC PDU which is transmitted in PCell.

In some embodiments of the disclosed technology, for an unlicensed cell, if MAC RARs in a different single frequency network (SFN) having the same RA-RNTI are multiplexed into one MAC PDU, for the receiving preambles, the corresponding SFN transmitting preamble is included in a sub-header with a RAPID field.

In addition, since the sub-header with RAPID from unlicensed cell is different from the sub-header from licensed cell, the BI sub-header based on some embodiments of the disclosed technology includes an indication for distinguishing the transmission through the licensed cell from the transmission through the unlicensed cell.

In some implementations, if the MAC RAR is from a new radio (NR) cell, the "R1" field is set to 0. Otherwise, the "R1" field is set to 1. In this scheme, the MAC RAR from licensed cell and unlicensed cell are separately generated. In some implementations, the UE may distinguish the cells by R1. FIG. 6 shows possible formats for SFN ID.

Figure 7:
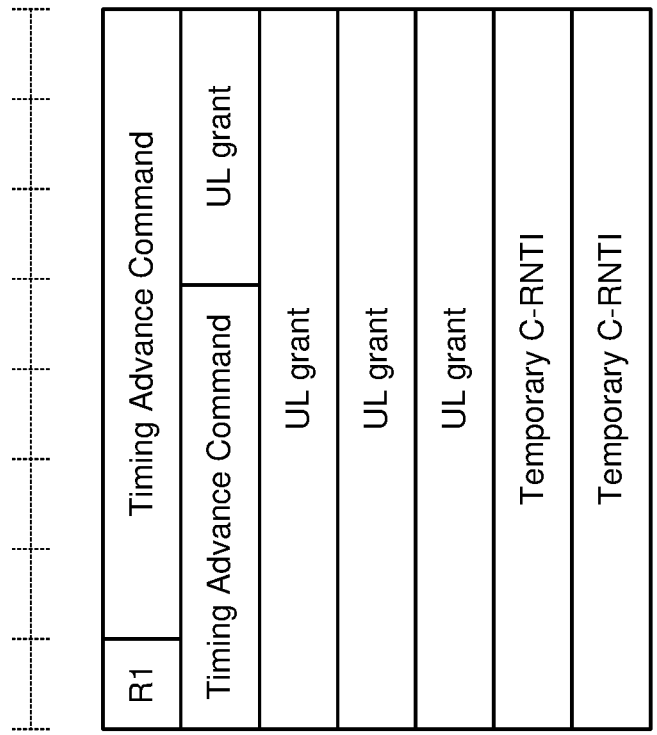
FIG. 7 illustrates an example configuration of random access response (RAR) format for a licensed cell based on some embodiments of the disclosed technology.
Figure 8:
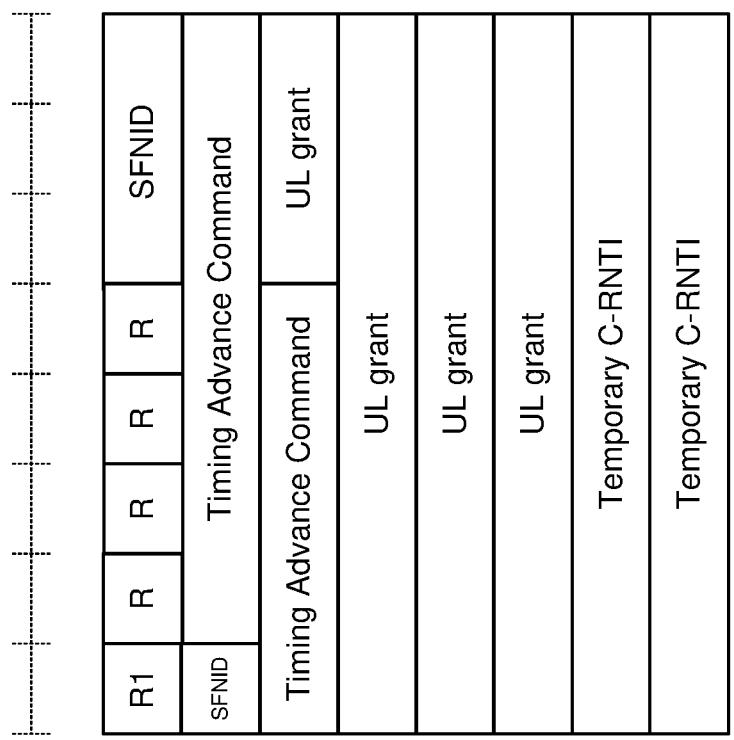
FIG. 8 illustrates an example configuration of RAR format for an unlicensed cell based on some embodiments of the disclosed technology.

FIG. 7 illustrates an example configuration of RAR format for a licensed cell based on some embodiments of the disclosed technology. FIG. 8 illustrates an example configuration of RAR format for an unlicensed cell based on some embodiments of the disclosed technology.

The field "Timing Advance Command" indicates the index value TA used to control the amount of timing adjustment that the MAC entity has to apply. The field "UL Grant" is an uplink grant field, which indicates the resources to be used on the uplink. The field "Temporary C-RNTI" indicates the temporary identity that is used by the MAC entity during Random Access.

In some embodiments of the disclosed technology, a MAC RAR is used to include an indication for distinguishing the transmission through the licensed cell from the transmission through the unlicensed cell. In addition, MAC RARs in the different SFN are multiplexed into one MAC PDU.

In some embodiments of the disclosed technology, the size of MAC RAR may be extended. FIGS. 7 and 8 show possible examples. In addition, in order to distinguish the MAC subPDU, the first reserved bit may be used for indicating whether the RAR belongs to the licensed cell or the unlicensed cell.

If the R1 field is set to 0, the MAC RAR is used for the licensed cell. Otherwise, the MAC RAR is used for the unlicensed cell. The UE may parse the MAC RAR according to the R1 field.

Figure 9:
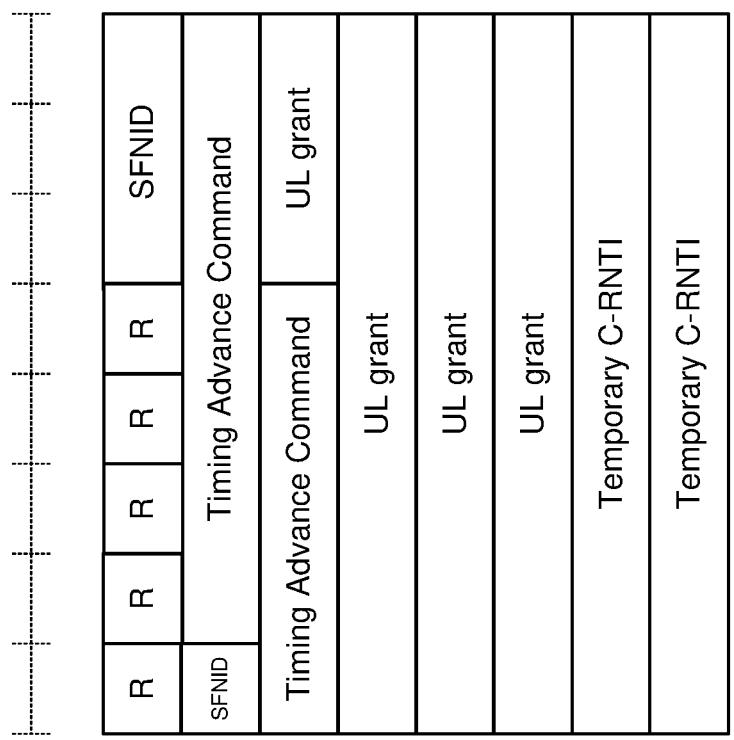
FIG. 9 illustrates another example configuration of RAR format for an unlicensed cell based on some embodiments of the disclosed technology.

FIG. 9 illustrates another example configuration of RAR format for an unlicensed cell based on some embodiments of the disclosed technology.

As discussed above, a MAC RAR can be configured to include the indication for distinguishing the transmission through the licensed cell from the transmission through the unlicensed cell. In addition, MAC RARs in the different SFN are multiplexed into one MAC PDU.

For this scheme, the size of MAC RAR based on some embodiments of the disclosed technology may be extended. FIG. 9 shows another possible example. In order to distinguish MAC RAR based on some embodiments of the disclosed technology, separate MAC PDUs may be generated for the licensed cell and the unlicensed cell.

Figure 10:
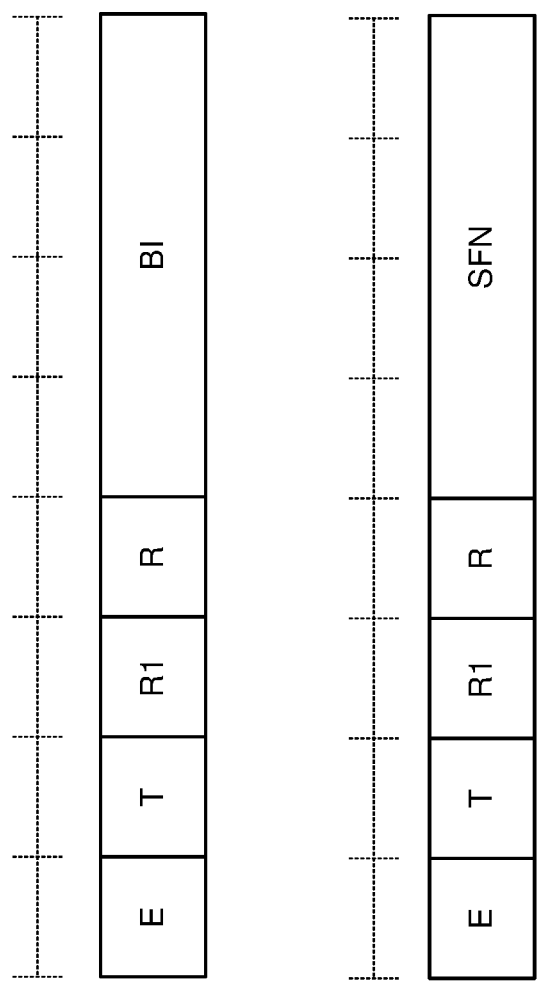
FIG. 10 illustrates an example configuration of a BI sub-header and an SFN sub-header based on some embodiments of the disclosed technology.
Figure 11:
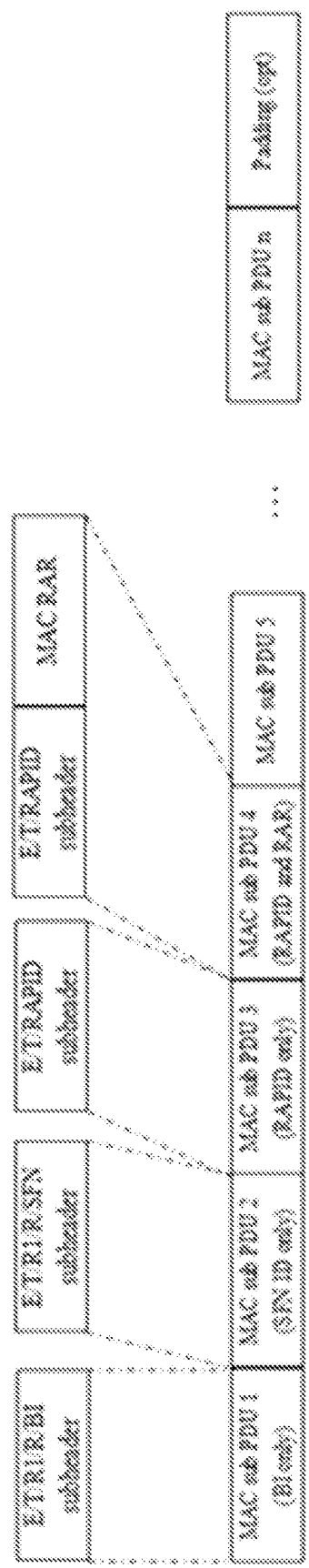
FIG. 11 illustrates an example of medium access control protocol data unit (MAC PDU) including SFN ID based on some embodiments of the disclosed technology.

FIG. 10 illustrates an example configuration of a BI sub-header and an SFN sub-header based on some embodiments of the disclosed technology. FIG. 11 illustrates an example of MAC PDU including SFN ID based on some embodiments of the disclosed technology.

In some embodiments of the disclosed technology, MAC RARs in the same SFN are multiplexed into one MAC PDU, and each MAC PDU is separately generated.

For one UE, multiple cells may be configured, for example, an unlicensed cell acts as PCell and a licensed cell acts as SCell. According to the current specification, for SCell, when a preamble is transmitted on SCell, the corresponding MAC RAR is transmitted on PCell. In some embodiments of the disclosed technology, when multiple preambles are received in the same PRACH resource, the corresponding MAC RAR from the different cells (e.g., PCell and SCell) may be multiplexed into one MAC PDU which is transmitted in PCell.

For unlicensed cell, if MAC RARs in the same SFN having the same RA-RNTI are multiplexed into one MAC PDU, one SFN id sub-header needs to be added as shown in FIG. 10 or SFN may be included in the sub-header with BI. Since SFN id sub-header for licensed cell is not needed, the MAC RARs from unlicensed cell and licensed cell may be separately placed in different MAC PDUs. In other words, for the licensed cell and unlicensed cell, two different MAC PDUs are generated.

For the unlicensed cell, one reserved bit may be used for indicating BI or SFN ID. In some implementations, R1 field is set to 0 to indicate the BI sub-header, and R1 field is set to 1 to indicate the SFN sub-header. FIG. 11 shows an example of MAC PDU consisting of MAC RARs.

Figure 12:
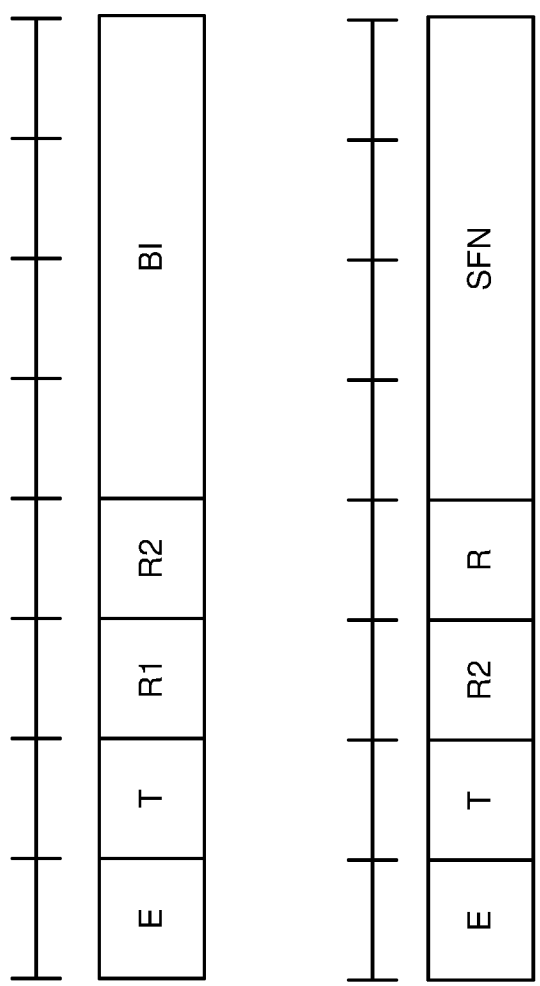
FIG. 12 illustrates an example configuration of a BI sub-header and an SFN sub-header for an unlicensed cell based on some embodiments of the disclosed technology.

FIG. 12 illustrates an example configuration of a BI sub-header and an SFN sub-header for an unlicensed cell based on some embodiments of the disclosed technology.

Like other examples discussed above, MAC RARs in the same SFN are multiplexed into one MAC PDU. In some embodiments of the disclosed technology, two different MAC PDUs are generated for the licensed cell and the unlicensed cell. In addition, in order for the UE to distinguish the MAC PDU from the licensed cell or the unlicensed cell, at least one distinction indication may be added to the sub-header with BI, as shown in FIG. 12.

In the sub-header with BI, the reserved bit R1 may be used for distinguishing purposes. In some implementations, the R1 field is set to 0 to indicate that the MAC PDU is used for the licensed cell, and the R1 is set to 1 to indicate that the MAC PDU is used for the unlicensed cell. The reserved bit R2 is used for indicating BI or SFNID. In one example, the R2 is set to 0 to indicate the BI sub-header, and the R2 is set to 1 to indicate the SFN ID sub-header. In some implementations, the SFN ID may be LSB of SFN transmitting preamble.

In this embodiment, the MAC RAR from licensed cell and unlicensed cell are separately generated. In other words, two different MAC PDUs are generated.

Figure 13:
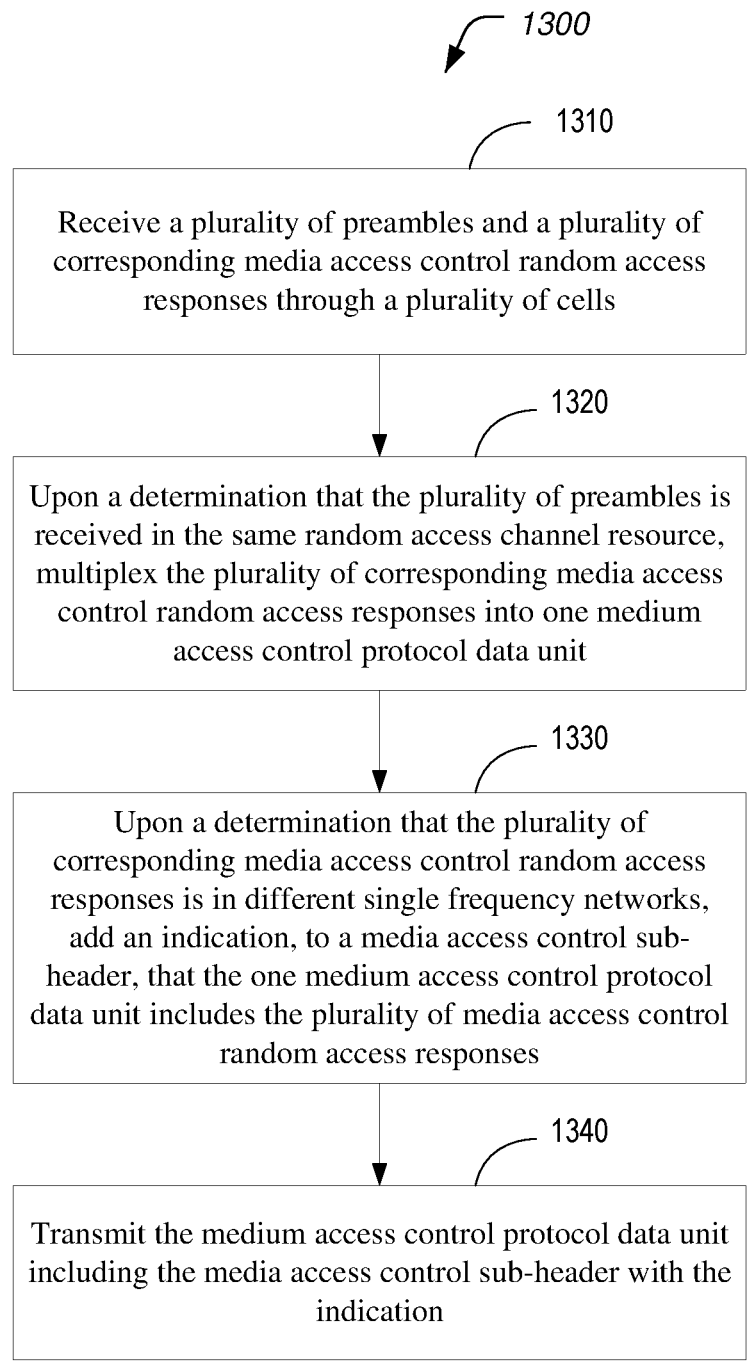
FIG. 13 is a flow diagram illustrating an example of a wireless communication method 1300 based on some embodiments of the disclosed technology.

FIG. 13 is a flow diagram illustrating an example of a wireless communication method 1300 based on some embodiments of the disclosed technology. The wireless communication method 1300 includes, at step 1310, receiving a plurality of preambles and a plurality of corresponding media access control random access responses through a plurality of cells, at step 1320, upon a determination that the plurality of preambles is received in the same random access channel resource, multiplexing the plurality of corresponding media access control random access responses into one medium access control protocol data unit, at step 1330, upon a determination that the plurality of corresponding media access control random access responses is in different single frequency networks, adding an indication, to a media access control sub-header, that the one medium access control protocol data unit includes the plurality of media access control random access responses, and, at step 1340, transmitting the medium access control protocol data unit including the media access control sub-header with the indication.

In some implementations, the different single frequency networks have the same random access response. In some implementations, upon receipt of the plurality of preambles and the plurality of corresponding media access control random access responses through an unlicensed cell, the indication includes a single frequency network preamble.

In some implementations, the plurality of cells includes both licensed cell and unlicensed cell, and wherein the method further includes adding an additional indication to the media access control sub-header to distinguish the licensed cell from the unlicensed cell. In some implementations, the media access control sub-header in the licensed cell has a different random access preamble identifier field format from the media access control sub-header in the unlicensed cell. In some implementations, the media access control sub-headers in the licensed cell and the unlicensed cell have a common field configured to have the same value. The common field may have a first value to indicate that the media access control sub-header includes a random access preamble identifier field. The common field may have a second value to indicate that the media access control sub-header includes both the random access preamble identifier field and a single frequency network identifier.

Figure 14:
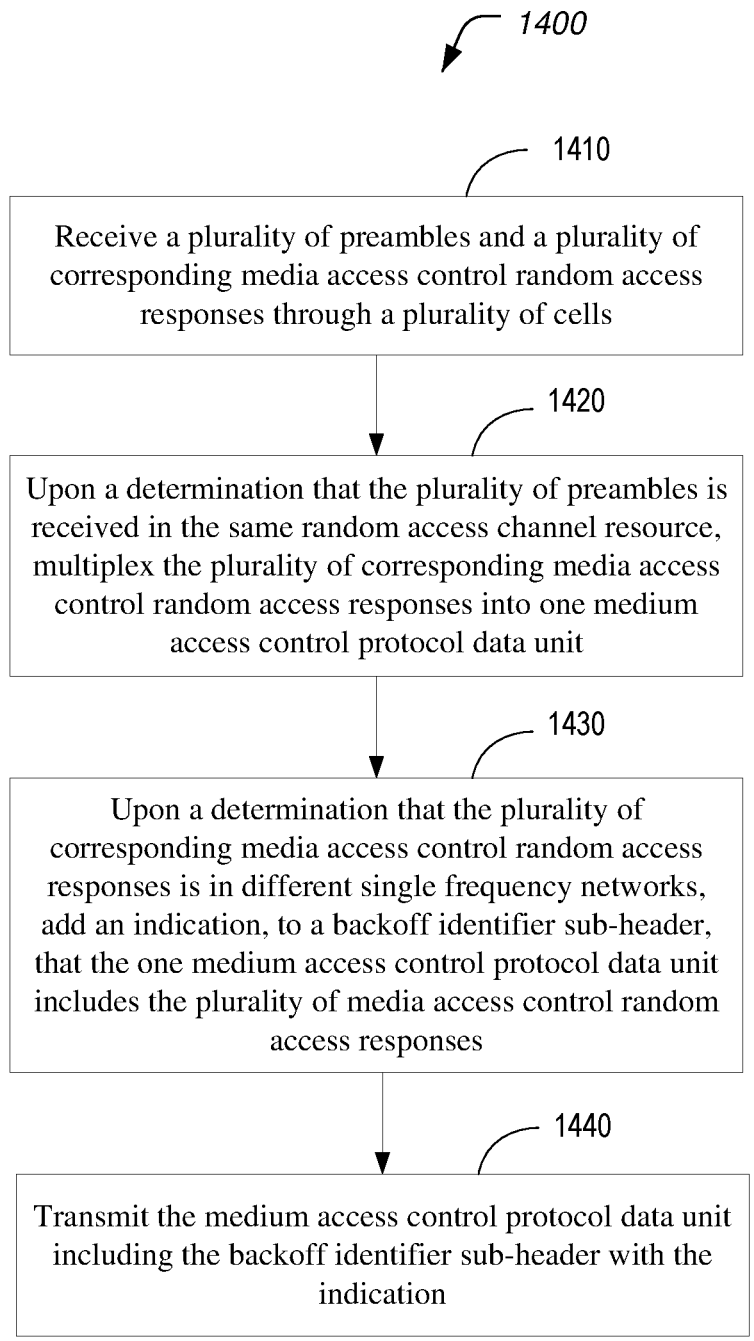
FIG. 14 is a flow diagram illustrating another example of a wireless communication method based on some embodiments of the disclosed technology.

FIG. 14 is a flow diagram illustrating an example of a wireless communication method 1400 based on some embodiments of the disclosed technology. The wireless communication method 1400 includes, at step 1410, receiving a plurality of preambles and a plurality of corresponding media access control random access responses through a plurality of cells, at step 1420, upon a determination that the plurality of preambles is received in the same random access channel resource, multiplexing the plurality of corresponding media access control random access responses into one medium access control protocol data unit, at step 1430, upon a determination that the plurality of corresponding media access control random access responses is in different single frequency networks, adding an indication, to a backoff indicator sub-header, that the one medium access control protocol data unit includes the plurality of media access control random access responses, and, at step 1440, transmitting the medium access control protocol data unit including the backoff indicator sub-header with the indication.

In some implementations, the different single frequency networks have the same random access response. In some implementations, upon receipt of the plurality of preambles and the plurality of corresponding media access control random access responses through an unlicensed cell, the indication includes a single frequency network preamble.

In some implementations, the media access control sub-header in the licensed cell has a different backoff indicator field format from the media access control sub-header in the unlicensed cell. In some implementations, the media access control sub-headers in the unlicensed cell has a field to indicate whether a certain media access control random access response is from a new radio cell.

Figure 15:
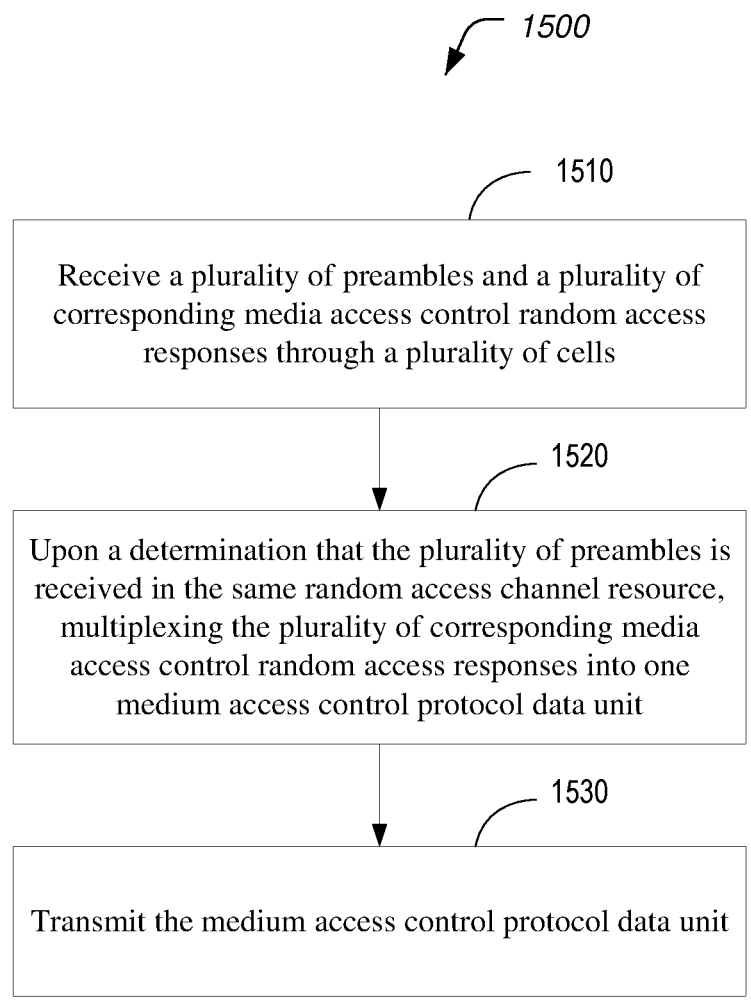
FIG. 15 is a flow diagram illustrating another example of a wireless communication method based on some embodiments of the disclosed technology.

FIG. 15 is a flow diagram illustrating an example of a wireless communication method 1500 based on some embodiments of the disclosed technology. The wireless communication method 1500 includes, at step 1510, receiving a plurality of preambles and a plurality of corresponding media access control random access responses through a plurality of cells, at step 1520, upon a determination that the plurality of preambles is received in the same random access channel resource, multiplexing the plurality of corresponding media access control random access responses into one medium access control protocol data unit, and at step 1430, transmitting the medium access control protocol data unit. Each of the plurality of media access control random access responses includes an indication to distinguish a part of the medium access control protocol data unit received through a licensed cell from another part of the medium access control protocol data unit received through an unlicensed cell.

In some implementations, the media access control random access responses in the licensed cell and the unlicensed cell have a common field configured to have the same value. In some implementations, the common field has a first value to indicate that the media access control random access responses are used in the licensed cell.

In some implementations, the plurality of cells includes both licensed cell and unlicensed cell, and wherein the method further includes generating separate medium access control protocol data units to distinguish the media access control random access responses received through the licensed cell from the media access control random access responses received through the unlicensed cell. In some implementations, wherein the medium access control protocol data unit received through the unlicensed cell includes a single frequency network identifier sub-header.

In some implementations, the media access control random access responses in the licensed cell and the unlicensed cell have a common field configured to indicate either a backoff indicator sub-header or a single frequency network.

Figure 16:
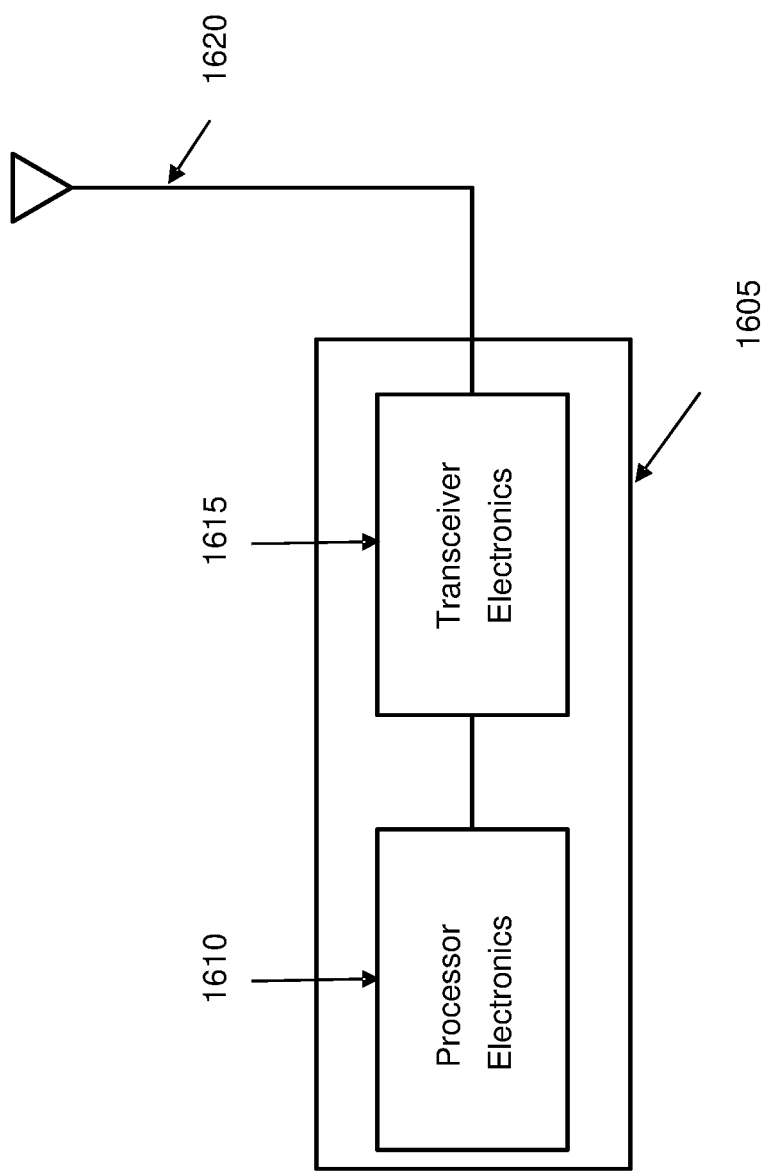
FIG. 16 is a block diagram representation of a portion of a radio station in accordance with one or more embodiments of the present technology can be applied.

FIG. 16 is a block diagram representation of a portion of a radio station in accordance with one or more embodiments of the present technology can be applied. A radio station 1305 such as a base station or a wireless device (or UE) can include processor electronics 1310 such as a microprocessor that implements one or more of the wireless techniques presented in this document. The radio station 1605 can include transceiver electronics 1615 to send and/or receive wireless signals over one or more communication interfaces such as antenna 1620. The radio station 1605 can include other communication interfaces for transmitting and receiving data. Radio station 1605 can include one or more memories (not explicitly shown) configured to store information such as data and/or instructions. In some implementations, the processor electronics 1610 can include at least a portion of the transceiver electronics 1615. In some embodiments, at least some of the disclosed techniques, modules or functions are implemented using the radio station 1605.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
    receiving a plurality of preambles and a plurality of corresponding media access control random access responses through a plurality of cells including a licensed cell and an unlicensed cell, wherein the plurality of preambles is received in a same random access channel resource, and the plurality of corresponding media access control random access responses is in a corresponding different single frequency network;
    multiplexing the plurality of corresponding media access control random access responses into one medium access control protocol data unit;
    adding a first value to an indication field in a media access control sub-header to indicate that the one medium access control protocol data unit includes at least one of the plurality of corresponding media access control random access responses that is transmitted through the unlicensed cell; or
    adding a second value to the indication field in the media access control sub-header to indicate that the one medium access control protocol data unit includes at least one of the plurality of corresponding media access control random access responses that is transmitted through the licensed cell; and
    transmitting the medium access control protocol data unit including the media access control sub-header.

2. The method of claim 1, wherein the different single frequency networks have a same random access response.

3. The method of claim 1, wherein the media access control sub-header in the licensed cell includes a different random access preamble identifier field format from the media access control sub-header in the unlicensed cell.

4. The method of claim 1, wherein the first value indicates the media access control sub-header includes a random access preamble identifier (RAPID) with a single frequency network identifier (SFNID).

5. The method of claim 1, wherein the second value indicates the media access control sub-header includes a random access preamble identifier (RAPID) without a single frequency network identifier (SFNID).

6. An apparatus for wireless communication, comprising a memory and a processor, wherein the processor reads code from the memory and implements a method comprising:
    receiving a plurality of preambles and a plurality of corresponding media access control random access responses through a plurality of cells including a licensed cell and an unlicensed cell, wherein the plurality of preambles is received in a same random access channel resource, and the plurality of corresponding media access control random access responses is in a corresponding different single frequency network;
    multiplexing the plurality of corresponding media access control random access responses into one medium access control protocol data unit;
    adding a first value to an indication field in a media access control sub-header to indicate that the one medium access control protocol data unit includes at least one of the plurality of corresponding media access control random access responses that is transmitted through the unlicensed cell; or
    adding a second value to the indication field in the media access control sub-header to indicate that the one medium access control protocol data unit includes at least one of the plurality of corresponding media access control random access responses that is transmitted through the licensed cell; and
    transmitting the medium access control protocol data unit including the media access control sub-header.

7. The apparatus of claim 6, wherein the different single frequency networks have a same random access response.

8. The apparatus of claim 6, wherein the media access control sub-header in the licensed cell includes a different random access preamble identifier field format from the media access control sub-header in the unlicensed cell.

9. The apparatus of claim 6, wherein the first value indicates the media access control sub-header includes a random access preamble identifier (RAPID) with a single frequency network identifier (SFNID).

10. The apparatus of claim 6, wherein the second value indicates the media access control sub-header includes a random access preamble identifier (RAPID) without a single frequency network identifier (SFNID).

* * * * *